United States Patent [19]

Smith et al.

[11] Patent Number: 5,033,808

[45] Date of Patent: Jul. 23, 1991

[54] QUICK DISCONNECT FIBER OPTIC FEEDTHROUGH FOR WELL BOREHOLE USAGE

[75] Inventors: Darren E. Smith, Houston; Kerry L. Sanderlin, Katy; Randy Gold, Houston, all of Tex.

[73] Assignee: Halliburton Logging Services, Inc., Houston, Tex.

[21] Appl. No.: 520,937

[22] Filed: May 8, 1990

[51] Int. Cl.[5] ............................................. G02B 6/36
[52] U.S. Cl. ................................................. 350/96.2
[58] Field of Search ......................... 174/70 R, 70 S; 350/96.2, 96.21, 96.23

[56] References Cited

U.S. PATENT DOCUMENTS

| | | | |
|---|---|---|---|
| 4,148,554 | 4/1979 | Magnusson et al. | 350/96.21 |
| 4,397,522 | 8/1983 | Parr | 350/96.21 |
| 4,544,233 | 10/1985 | Iwamoto et al. | 350/96.2 |
| 4,759,601 | 7/1988 | Knutsen et al. | 350/96.21 |
| 4,787,701 | 11/1988 | Stenger et al. | 350/96.21 |

Primary Examiner—John D. Lee
Assistant Examiner—John Ngo
Attorney, Agent, or Firm—William J. Beard

[57] ABSTRACT

An optical fiber quick disconnect mechanism comprised of left and right separable portions is set forth. One portion is ideally anchored to a pressure isolating bulkhead at a drilled passage which is provided with threads partly along its length; a fixed portion of the quick disconnect mechanism can be anchored there. This enables division of an optical fiber into left and right portions which provide an optical path therethrough. The left and right optical portions are supported by alignment capillaries and the detachable portion of the equipment includes a threaded body which joins to the fixed portion.

10 Claims, 1 Drawing Sheet

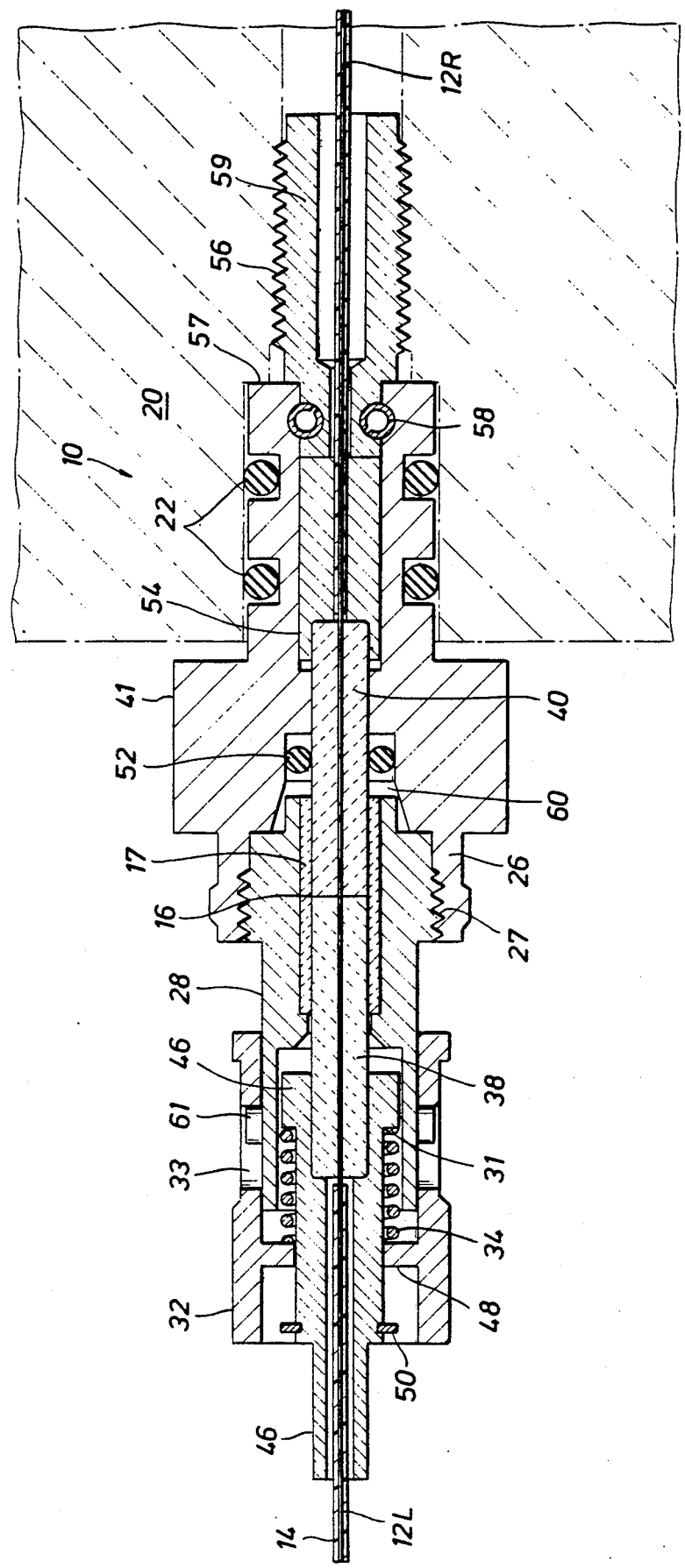

QUICK DISCONNECT FIBER OPTIC FEEDTHROUGH FOR WELL BOREHOLE USAGE

BACKGROUND OF THE INVENTION

This invention relates to well logging and more particularly to a well logging system incorporating fiber optic well logging cable for use in boreholes.

Requirements in modern well logging systems for extremely wide bandwidths on the order of tens of megahertz have caused the introduction of well logging cables having outer armour and employing several electrical conductors disposed within the armour in conjunction with one or more fiber optic components having extremely wide optical bandwidths for the transmission of data in both analog and digital form to and from a downhole tool.

The invention described in the present disclosure is directed to a feedthrough connector and more particularly, one which is able to support and join a divided optical fiber at an intersection point such as a well logging tool bulkhead. Establishing optical communication paths along optical fibers crossing pressure differential bulkheads can create problems similar to but significantly different from the problem of carrying electrical conductors through such bulkheads. Examples of prior art feedthrough connectors are shown in U.S. Pat. No. 4,593,970 and 4,607,911 and 4,891,640 which is assigned to the assignee of the present invention. One particular difference between the passage of an optical fiber from an electrical conductor through a bulkhead is that the optical fiber must be supported in some fashion to maintain its optical integrity without exerting undue bending forces on the fiber. In well borehole usage, however, the optical fiber must be used repeatedly in hostile enviromental circumstances. It may carry optical signals representing data from an ambient atmospheric pressure through a wall or bulkhead into a extremely high pressure, high temperature environment. It is not uncommon to encounter temperatures as high as 400° C. to 500° F. and ambient pressures up to 25,000 psi in well boreholes. Whatever the circumstances, the optical fiber typically must communicated an optical path through an opening formed in a bulkhead so that it can provide means for communicating high data rate data a cross a bulkhead in a pressure isolated well logging tool which is lowered into the well.

The data output of a modern well logging tool can be so great as to require the bandwith of an optical fiber to deliver the data from the logging tool to the surface. When the optical fiber passes through a bulkheat, it must have a tight pressure seal formed around it by the feedthrough and yet must be optically transparent enough so that light signals are transmitted along the fiber or through the junction of two fibers. Pressure leakage from one environment to another is prevented by the optical feedthrough connector of the present invention. Moreover, this feedthrough should have a mechanism which enables it to be mounted on the supporting bulkhead or frame member for a quick disconnection, if desired, when it is necessary to remove the logging cable from the tool, for example. In this regard, the optical feedthrough according to the concepts of the present invention includes a structure which mechanically attaches to the supportive substructure without inflicting additional stress on the optical fiber and maintains alignment of the optical fiber at the junction of its severance in such a manner as to provide a continuous optical path across the junction. Moreover, the structure of the present invention provides a device for this purpose which is quickly separable and which is able to secure the optical fiber in passage through a bulkhead in a fluid tight manner without undue forces impinging on the optical fiber.

While these advantages are important advantages, there are additional benefits obtained through the apparatus of the present invention. The device can be installed and located at a particular location on a well logging instrument in a manner such that the optical fibers forms a continuous path of optical nature through a pressure differential bulkhead and aligns and supports the optical fiber from the well logging cable to the interior of the down hole instrument package.

BRIEF DESCRIPTION OF THE DRAWINGS

So that the manner in which the above features and advantages of the present invention are attained and can be understood in more detail, a more particular description of the invention may be had by reference to the embodiment described in the appended drawings.

It is to be noted, however, that the appended drawing illustrates only one typical embodiment of this invention and is therefore not to be considered limiting of its scope for the invention may admit to other equally effective arrangements and geometrical shapes.

One view is shown in the drawing of the present invention. This view is a longitudinal sectional view through the two piece quickly separable optical feedthrough connector. This view shows the construction details of the connector and illustrates an optical path which is continuous across a pressure differential bulkhead in a well logging environment.

DESCRIPTION OF THE PREFERRED EMBODIMENT

Referring now to the drawing, the apparatus of the present invention is identified generally by the numeral 10. A separable two piece connector for mounting on a bulkhead 20 and for joining an optical fiber 12 which is devided into two pieces 12L and 12R is illustrated in longitudinal sectional view. An optical interface 16 is formed between the two optical fiber portions 12L and 12R when the connector 10 of the present invention is joined as shown in the drawing. It will be understood by those skilled in the art that the optical interface 16, while it is shown in a snug fitting or touching relationship in the drawing, may in practice contain a slight gap due to imperfections in the polishing of the faces of the optical fiber bearing capillaries 38 and 40 and the ends of fiber portions 12L and 12R of the two connector halves. In practice the ends of the optical fibers 12L and 12R are polished optically flat and the optical integrity of the pathway between the two fiber halves is preserved at the juncture 16 by a high viscosity silicone grease, for example, Dow Corning High Vacuum Grease. The presence of the high viscosity grease at the optical juncture 16 prevents the encroachment of water which could permeate the interior of the left connector half from reaching the highly polished optical faces of the ends of fibers 12L and 12R should it reach the interior of the left half of the detachable connector 10 shown in the drawing.

The connector 10 further comprises a removable left hand member comprising a threaded generally cylindrical body member 28 which supports a detachable capillary structure 38, which will be described in more detail subsequently, having a capillary bore (very small diameter) therethrough which supports the detachable part of the optical fiber 12L of the drawing figure.

In practice, optical fibers for use in well boreholes are hermatically sealed by applying a material such as a metallic oxide along its length and circumference durin its manufacture. This fiber is then overlaid with insulation material 14 such as fluorocarbon plastic so that in appearance it has the appearance of an electrical wire. The fiber 12L of the drawing has a diameter small enough so that the fiber 12L may enter the capillary sized bore of the capillary support structure 38. The bore of structure 38 is sized to receive the diameter of the fiber 12L and is held in place by a seat member 46.

A spring member 34, which abuts an internal shoulder 48 on a bayonet type connector sleeve 32 at one end, engages an internal shoulder portion 31 of the capillary seat 46 at its opposite end. Thus the bayonet sleeve 32 is capable of logitudinal motion along the axis of the fiber 12L by compression of the spring member 34. Notches 33 extending through the sleeve 32 formed as a J-shaped detent or slot engage mating lugs 61 on the outer surface of the body member 28. Thus the outer sleeve member 32 may be held in locked engagement with the body member 28 by compression of spring 34 and the engagement of these lug members 61 in the slots 33 at the detent portions provided therein.

The capillary support structure 38 is nested in and concentric with the inner surface of an alignment sleeve 17. Sleeve 17 can provide additional support in guiding the insertion of capillary support structure 38 into touching engagement at the optical junction 16 with a second and similar capillary portion 40 which is held in the fixedly mounted right hand portion of the connector 10 of the drawing of the present invention. The optical fiber 12L is held in the capillary bore of the capillary structure 38 by a high temperature expoxy glue material. The fiber 12R is held in a similar fashion.

Turning now to the right hand fixedly mounted portion of the connector of the present invention, a typical bulkhead 20 having at least a partially threaded opening is an anchor for a main body member 41 of the fixedly mounted portion of the connector 10 by threads 56. A load bearing shoulder surface 57 is provided at the juncture of fixed body member 41 with fixed bulkhead 20. The bulkhead member 20 has a bore therethrough which is coaxial with the threaded portion 56 of the bore and which has an enlarged diameter compared to the threaded portion 56. The circular wall of this enlarged bore engages a pair of O-rings 22 which lie in retaining grooves cut into the exterior cylindrical surface of the fixed body member 41 of the connector 10. A fiber bearing capillary support structure 40 surrounds the end portion of the optical fiber 12R with a capillary bore threthrough in which the fiber 12R may be adhesively mounted such as by epoxy resin therein in a manner similar to that previously described with respect to the removable half 12L. The body member 41 of the fixed portion of the high pressure feedthrough connector is internally recessed to provide an annular space 60 where another O-ring 52 provides a pressure seal. This seal is formed between the fixed body member 41 and the outer circumference of the capillary member 40. The capillary member 40 is pressed fit into a hollow seat of a cylindrical retainer member 54 which is provided with a bore therethrough for receiving the optical fiber 12R in the manner shown in the drawing. The retaining member 54 is held in place in the bore of the fixed body member 41 by a threaded retainer 56 having a coaxial bore aligned with the bore of retaining member 54. The threaded retaining member 59 has threads for engaging the bulkhead mounting member 20 and is held in place at the body member 41 by retaining roll pins 58 which are mounted in a conventional manner in grooves formed in retaining member 59 for this purpose.

The capillary member 40 of the fixed portion of the connector 10 must bear a hydrostatic load since it is sealing from an inner space to the right of the drawing which is typically at atmospheric pressure to an outer or external environment which can be at variable pressure according to depth in the well bore. Thus the material of this capillary member 40 should be a load bearing material such as metal, ceramic or the like having high compressive strength.

On the other hand, the capillary structure member 38 of the left hand or detachable portion of the connector 10 doesnt not have to support any substantial load. Thus it may be formed from glass, ceramic, metal or even plastic if desired. The O-ring pressure seals 22 and 52 of the prefferred embodiment are provided with modest compression when captured in their grooves in the case of O-rings 22 and in the recess 60 in the case of O-ring 52. These grooves and annular spaces allow for compression of the O-rings in accordance with good engineering practice. Thus, pressure sealing is assured without undue wear and degeneration of the O-rings themselves.

In practice, the connector 10 may be assembled as follows. First, consider only the detachable left hand portion. The capillary 38 is pressed into the seat 46. The spring 34 is positioned on the exterior of the seat 46. The bayonet sleeve 32 is next passed over the spring 34 and the left hand end of the seat 46. The spring 34 is compressed and the snap ring 50 is then placed in the groove provided for it. Once the snap ring 50 is in place, the spring is permitted to expand. It is captured as illustrated so that it will not expand any further than the snap ring 50 permits. The end of the fiber id stripped of insulation. A suitable glue is placed in contact with the stripped tip 12L of the optical fiber and the capillary 38 as the fiber tip is inserted. Excessive length of the fiber is inserted for the moment but surplus extending from the right hand end of the capillary 38 is trimmed, and the end of the fiber is polished to assure an acceptable high quality optical connection.

At the right hand side, assembly is accomplished in the following fashion. The capillary 40 is pressed into the seat 54. A portion of the optical fiber at 12R is stripped and is inserted with the appropriate adhesive into the capillary 40. Surplus extending out of the end is trimmed by cleaving and the end is polished to obtain a quality optical connection. The capillary 40 and the seat 54 are inserted into the body 41. The threaded retainer 59 is installed and the retainer pins 58 are used for this. The O-ring 52 is positioned on the capillary 40. The alignment sleeve 17 is installed on the outer surface of the capillary 40. The detachable body 28 can then be screwed into the mating threads 27 in the surrounding lip or skirt 26. The O-rings 22 are placed in the appropriate grooves to then permit threading of the entire connector assembly 10 into the bulkhead 20 at the appropriate tapped opening. Ordinarily, the two capillaries are brought together by placing a high viscosity coupling grease on one or both optical faces at 16. Disassembly, however, is achieved quite easily. That is, the threaded member 28 is unthreaded by rotation and pulled free; it can be reattached simply by threading the two halves of the connector 10 together at the threads 27. The quick disconnect feature of the connector may be provided by leaving the detachable body member 28 attached by threads 27 to the fixed portion. The capillary member 38 of the detachable portion of the connector may then be disengaged from the body member 28 by simply disconnecting the bayonet connector by disengaging the detents at slots 33 (twist and pull to unlock).

The O-ring seals 22 and 52 provide fluid tight pressure barriers against transmission of the pressures from the external portion of mounting substructure 20 to the interior portion. The optical fiber is supported along its length by forces supplied by the capillary structure members 38 and 40 which are held in alignment by the mechanical arrangement shown to form an optical interface at 16. The quick disconnect feature on the high pressure side of the connector is provided by the bayonet sleeve member 32 and its associated hardware.

While the foregoing descriptions may make other alternative embodiments apparent to those of skill in the art, it is the aim of the appended claims to cover all such changes and modifications as fall within the true spirit and scope of the invention.

What is claimed is:

1. A fiber optic feed through connector adapted for well borehole use and having a fixed portion and a detachable portion comprising:
   (a) a fixed portion body member having an internal longitudinal bore therethrough and being of a generally cylindrical shape having plural outer surface areas, said internal bore being adapted at one end thereof for engagement with said detachable portion and at the opposite end with means for fixedly attaching said fixed portion body member to a support member;
   (b) a fixed portion load bearing capillary structure member being sized for and disposed in said fixed portion body member internal bore and having a smaller diameter longitudinal capillary bore therethrough sized for receiving one end of a terminated fiber optic member and means for retaining said fixed portion load bearing capillary structure member in said internal longitudinal bore in said fixed portion body member and means for forming a fluid tight seal between said fixed portion load bearing capillary structure member and said fixed portion body member;
   (c) a detachable portion body member having an internal longitudinal bore therethrough and being of a generally cylindrical shape having plural outer surface areas, one of said plural outer surface areas adapted at one end thereof for engagement with said fixed portion body member and a second outer surface area at the opposite end being adapted for mating engagement with a release mechanism;
   (d) a detachable portion non-load bearing capillary structure member sized for and disposed in said detachable portion body member internal bore and held therein by said release mechanism, said detachable portion non-load bearing capillary structure member having a smaller diameter longitudinal capillary bore therethrough sized for receiving one end of a terminated fiber optic member;
   (e) alignment means in said internal bore of said body member, sized to enclose the outer diameter of said fixed and detachable portion capillary structure members; and
   (f) said detachable portion body member and said fixed portion body member being arranged such that when an abutting engagement of said two connector portion is accomplished, said ends of said terminated fiber optic members are brought together by said alignment means in close proximity to each other and in axial alignment at an optical interface thereby defining a continuous optical path across their terminated ends.

2. The connector of claim 1 and further including means disposed on the terminated ends of said fiber optic members for preventing water contact with said terminated ends when engaged at said optical interface.

3. The apparatus of claim 2 wherein said means for preventing water contact comprises a high viscosity silicone grease.

4. The connector of claim 1 and further including sealing means disposed on an exterior diameter of said fixed portion body member to provide a fluid tight pressure seal between said body member and said support member.

5. The connector of claim 1 wherein said detachable portion capillary member comprises a high temperature glass member.

6. The connector of claim 1 wherein said detachable portion capillary member comprises a ceramic member.

7. The connector of claim 1 wherein said detachable portion capillary member comprises a metal member.

8. The connector of claim 1 wherein said fixed portion capillary member comprises a ceramic load bearing member.

9. The connector of claim 1 wherein said fixed portion capillary member comprises a metal load bearing member.

10. The connector of claim 1 and further including means disposed in the bore of said fixed capillary member for providing a seal between said capillary and said fiber optic.

* * * * *